United States Patent
Tanaka

(10) Patent No.: US 8,681,402 B2
(45) Date of Patent: Mar. 25, 2014

(54) IMAGE PROCESSING APPARATUS AND METHOD FOR DISCRIMINATING WHETHER DOCUMENT IS COLOR DOCUMENT OR BLACK AND WHITE DOCUMENT, IMAGE FORMING APPARATUS AND FACSIMILE MACHINE INCLUDING THE IMAGE PROCESSING APPARATUS AND A COMPUTER READABLE RECORDING MEDIUM STORING IMAGE PROCESSING PROGRAM

(75) Inventor: Kunihiko Tanaka, Osaka (JP)

(73) Assignee: Kyocera Mita Corporation (JP)

( * ) Notice: Subject to any disclaimer, the term of this patent is extended or adjusted under 35 U.S.C. 154(b) by 242 days.

(21) Appl. No.: 13/166,169

(22) Filed: Jun. 22, 2011

(65) Prior Publication Data

US 2011/0317231 A1 Dec. 29, 2011

(30) Foreign Application Priority Data

Jun. 29, 2010 (JP) ................. 2010-147363

(51) Int. Cl.
- *H04N 1/32* (2006.01)
- *H04N 1/04* (2006.01)
- *H04N 1/46* (2006.01)
- *G06K 15/00* (2006.01)
- *G06K 9/00* (2006.01)
- *H04N 5/235* (2006.01)

(52) U.S. Cl.
USPC ........... 358/504; 358/468; 358/486; 358/491; 358/496; 358/497; 358/1.14; 382/135; 348/222.1

(58) Field of Classification Search
USPC ........ 358/491, 496, 497, 468, 486, 504, 1.14; 382/135; 348/222.1
See application file for complete search history.

(56) References Cited

U.S. PATENT DOCUMENTS

| 5,721,628 A | 2/1998 | Takaragi et al. |
| 6,594,039 B1 * | 7/2003 | Kanbayashi ................. 358/491 |
| 2003/0095272 A1 * | 5/2003 | Nomizu |
| 2007/0064118 A1 * | 3/2007 | Mishina .................... 348/222.1 |
| 2007/0122022 A1 * | 5/2007 | Shimizu et al. .............. 382/135 |

FOREIGN PATENT DOCUMENTS

| JP | 2-249365 | 10/1990 |
| JP | 2001-128024 | 5/2001 |
| JP | 2005-80101 | 3/2005 |
| JP | 2009-260640 | 11/2009 |

\* cited by examiner

*Primary Examiner* — Miya J Cato
*Assistant Examiner* — Temitayo Folayan
(74) *Attorney, Agent, or Firm* — Gerald E. Hespos; Michael J. Porco; Matthew T. Hespos

(57) ABSTRACT

An image processing apparatus includes a document conveying unit, an image reading unit, a gradient calculating unit, a gradient comparing unit and a document discriminating unit. The image reading unit scans a document conveyed by the document conveying unit in a scanning direction orthogonal to a conveying direction and detects pixel values of color components of each pixel. The gradient calculating unit calculates a gradient of the pixel value of each color component in the conveying direction for each pixel based on the detected pixel values. The gradient comparing unit compares differences of gradients among color components for each pixel and extracts the pixel where the graduent difference is below a threshold value. The document discriminating unit discriminates whether each pixel is color or black-and-white based on pixel values using discrimination criteria different for the specific pixels extracted by the gradient comparing unit and other pixels.

8 Claims, 6 Drawing Sheets

IMAGE PROCESSING APPARATUS AND METHOD FOR DISCRIMINATING WHETHER DOCUMENT IS COLOR DOCUMENT OR BLACK AND WHITE DOCUMENT, IMAGE FORMING APPARATUS AND FACSIMILE MACHINE INCLUDING THE IMAGE PROCESSING APPARATUS AND A COMPUTER READABLE RECORDING MEDIUM STORING IMAGE PROCESSING PROGRAM

BACKGROUND OF THE INVENTION

1. Field of the Invention

The present invention relates to an image processing apparatus and an image processing method for automatically discriminating whether a document is a color document or a black-and-white document, an image forming apparatus and a facsimile machine including the image processing apparatus, and a computer readable recording medium storing an image processing program.

2. Description of the Related Art

Some of color complex machines and color scanners have an automatic color document discrimination function of automatically discriminating whether a document is a color document or a black-and-white document based on image data obtained by scanning the document with an image reader. For example, in a certain color document discrimination technology, a mechanism is provided which discriminates whether each pixel (or area) is chromatic color or achromatic color based on a predetermined threshold value from a plurality of color component signals of each pixel, and determines that the document is a color document if a ratio of chromatic pixels (or areas) to the total pixels (or total area) is larger than a predetermined threshold value. In other words, the document is determined to be a color document if the chromatic pixels (or areas) account for a predetermined area or larger on the document while being determined to be a black-and-white document unless otherwise. By controlling color/black-and-white copying (scanning) according to this determination result, a user needs not instruct color/black-and-white copying (scanning) for each document, whereby convenience is improved.

With the increase in the use of color complex machines in offices and the like in recent years, there is a growing need to set a plurality of documents at one time and automatically copy/scan, and automatic document feeders (ADFs) are frequently used. Conveyor rollers for conveying documents, a motor for driving the conveyor rollers, etc. are provided in this automatic document feeder.

In the case of reading documents using the automatic document feeder, color drift may occur in a document conveying direction due to a conveying speed ripple, a slight vibration, and the like, the conveying speed ripple being caused by a rotational speed ripple of the motor, slippage between the documents and the conveyor rollers, and the like, the slight vibration being produced when the documents are nipped by the conveyor rollers or separated from the conveyor rollers, etc. There have been cases where the presence of chromatic pixels is determined in an edge part of a black character or the like and accuracy of color document discrimination is adversely affected due to this color drift.

Various color document discrimination technologies have been conventionally known as those for suppressing the influence of such color drift on color document discrimination. In a certain color document discrimination technology, an achromatic area is detected from an input image and it is prevented that color drift in an edge part of the achromatic area is determined to be color by extending this achromatic area. In another color document discrimination technology, an influence by color drift is suppressed by making a color document discrimination function inoperative for a predetermined area of an input image where color drift is assumed to occur. In still another color document discrimination technology, an influence by color drift is suppressed by switching a color document discrimination parameter to a parameter with an increased level of discrimination criterion to make color document discrimination difficult for a predetermined area of an input image.

SUMMARY OF THE INVENTION

The present invention is a further improvement of the above prior art.

An image processing apparatus according to one aspect of the present invention includes a document conveying unit, an image reading unit, a gradient calculating unit, a gradient comparing unit and a document discriminating unit. The document conveying unit conveys a document in a predetermined conveying direction. The image reading unit repeatedly scans the document conveyed by the document conveying unit in a main scanning direction substantially orthogonal to the conveying direction and detects pixel values of a plurality of color components of each pixel. The gradient calculating unit calculates a gradient of the pixel value of each of the plurality of color components in the conveying direction for each pixel based on the pixel values of the plurality of color components of each pixel detected by the image reading unit. The gradient comparing unit compares a difference of the gradient among the plurality of color components for each pixel and extracts the pixel, of which the difference of the gradient is below a predetermined threshold value, as a specific pixel. The document discriminating unit discriminates whether each pixel is color or black-and-white based on the pixel values of the plurality of color components of each pixel detected by the image reading unit using pixel discrimination criteria different for the specific pixels extracted by the gradient comparing unit and other pixels.

An image forming apparatus according to another aspect of the present invention includes the above image processing apparatus, and an image forming unit that forms an image on a sheet. The image processing apparatus further includes an image processing unit and an image output unit. The image processing unit performs an image processing on the pixel values detected by the image reading unit according to a discrimination result by the document discriminating unit. The image output unit outputs an image processing result by the image processing unit to the image forming unit. The image forming unit forms the image based on an output from the image output unit.

A facsimile machine according to still another aspect of the present invention includes the above image processing apparatus, and a transmitting unit that transmits an image outside. The image processing apparatus further includes an image processing unit and an image output unit. The image processing unit performs an image processing on the pixel values detected by the image reading unit according to a discrimination result by the document discriminating unit. The image output unit outputs an image processing result by the image processing unit to the image forming unit. The transmitting unit transmits the image based on an output from the image output unit.

An image processing method according to still another aspect of the present invention includes an image reading step, a gradient calculating step, a gradient comparing step and a document discriminating step. In the image reading step, a document is repeatedly scanned in a main scanning direction substantially orthogonal to a predetermined conveying direction while being conveyed in the conveying direction by a document conveying unit and pixel values of a plurality of color components are detected for each pixel. In the gradient calculating step, a gradient of the pixel value of each of the plurality of color components in the conveying direction is calculated for each pixel based on the pixel values of the plurality of color components of each pixel detected in the image reading step. In the gradient comparing step, a difference of the gradient among the plurality of color components is compared for each pixel and the pixel, of which the difference of the gradient is below a predetermined threshold value, is extracted as a specific pixel. In the document discriminating step, whether each pixel is color or black-and-white is discriminated based on the pixel values of the plurality of color components of each pixel detected in the image reading step using pixel discrimination criteria different for the specific pixels extracted in the gradient comparing step and other pixels.

A non-transitory computer readable recording medium according to still another aspect of the present invention is a recording medium that stores an image processing program which causes a computer to function as an image processing apparatus. The program causes the computer to function as a document conveying unit, an image reading unit, a gradient calculating unit, a gradient comparing unit, and a document discriminating unit. The document conveying unit conveys a document in a predetermined conveying direction. The image reading unit repeatedly scans the document conveyed by the document conveying unit in a main scanning direction substantially orthogonal to the conveying direction and detects pixel values of a plurality of color components of each pixel. The gradient calculating unit calculates a gradient of the pixel value of each of the plurality of color components in the conveying direction for each pixel based on the pixel values of the plurality of color components of each pixel detected by the image reading unit. The gradient comparing unit compares a difference of the gradient among the plurality of color components for each pixel and extracts the pixel, of which the difference of the gradient is below a predetermined threshold value, as a specific pixel. The document discriminating unit discriminates whether each pixel is color or black-and-white based on the pixel values of the plurality of color components of each pixel detected by the image reading unit using pixel discrimination criteria different for the specific pixels extracted by the gradient comparing unit and other pixels.

These and other objects, features and advantages of the present invention will become more apparent upon reading the following detailed description along with the accompanying drawings.

BRIEF DESCRIPTION OF THE DRAWINGS

FIGS. 4A and 4B are graphs showing examples of pixel values of R, G and B components of a black character, wherein FIG. 4A shows a case where there is no color drift and FIG. 4B shows a case where there is color drift.

DETAILED DESCRIPTION OF THE PREFERRED EMBODIMENTS

One embodiment of the present invention is described below with reference to the drawings.

Figure 1:
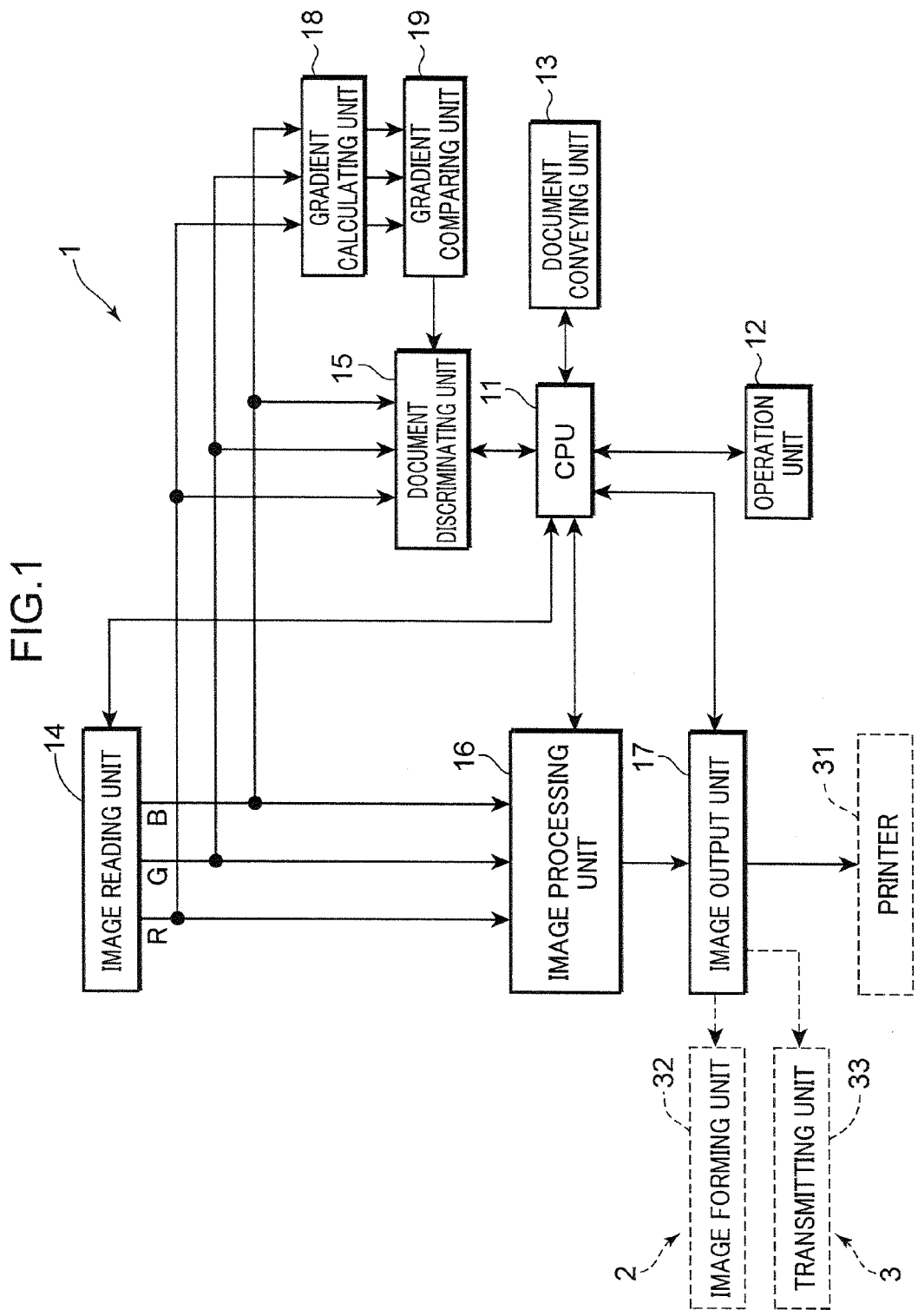
FIG. 1 is a block diagram showing the construction of an image processing apparatus according to one embodiment of the invention.

FIG. 1 is a block diagram showing a construction of an image processing apparatus 1 according to an embodiment of the present invention. This image processing apparatus 1 is an apparatus that reads a document, outputs a read document image to an external apparatus such as a printer 31 (shown in broken line in FIG. 1), and includes a CPU 11.

The CPU 11 is responsible for an overall operation control of the image processing apparatus 1. An operation unit 12, a document conveying unit 13, an image reading unit 14, a document discriminating unit 15, an image processing unit 16 and an image output unit 17 are connected to the CPU 11. The image reading unit 14 is connected to the document discriminating unit 15, the image processing unit 16 and a gradient calculating unit 18. The gradient calculating unit 18 is connected to a gradient comparing unit 19, which is connected to the document discriminating unit 15. Note that detailed functions of the document discriminating unit 15, the gradient calculating unit 18 and the gradient comparing unit 19 are described later.

The operation unit 12 is for receiving operations by a user such as operation start. The operation unit 12 is configured to be able to set any one of a color mode, a black-and-white mode and an automatic color document discrimination mode as a document reading mode upon outputting a document image. The document conveying unit 13 includes conveyor rollers, a motor that drives the conveyor rollers, and the like, and conveys documents stacked on one another one by one in a predetermined conveying direction along a predetermined conveyance path.

The image reading unit 14 is fixed near the conveyance path, repeatedly scans a document conveyed by the document conveying unit in a main scanning direction substantially orthogonal to the conveying direction to detect pixel values of a plurality of color components, for example three components of R (red), G (green) and B (Blue) in this embodiment for each pixel, and sends the detected pixel values of the respective color components as image data to the document discriminating unit 15, the image processing unit 16 and the gradient calculating unit 18. The pixel values (image data) are multi-value data of 256 gradations (8 bits) of 0 to 255 for instance.

Mode information set in the operation unit 12 is sent to the CPU 11. The CPU 11 controls the image processing unit 16 based on the mode information sent from the operation unit 12. The CPU 11 also controls the image processing unit 16 based on a discrimination result by the document discriminating unit 15 in the case of the automatic color document discrimination mode. The image processing unit 16 performs an image processing corresponding to the mode information and the discrimination result of the document discriminating unit 15 on the image data sent from the image reading unit 14 in accordance with a control of the CPU 11 and outputs the processed image data to the image output unit 17. The image output unit 17 outputs the processed image data sent from the image processing unit 16 outside.

Figure 2:
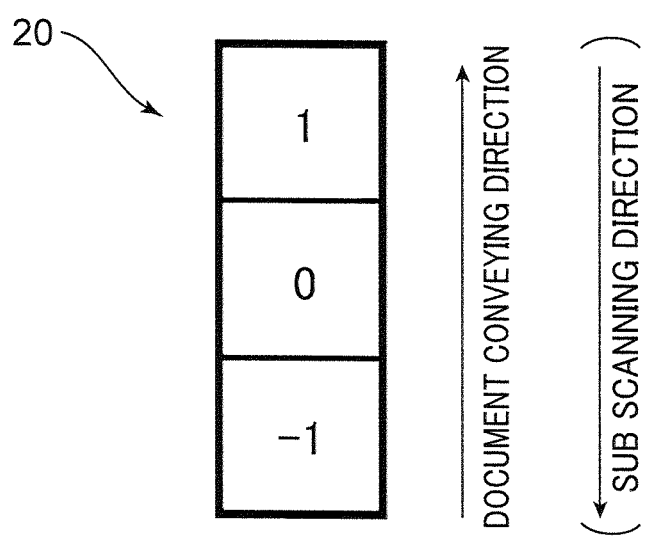
FIG. 2 is a diagram showing a gradient calculation filter used in a gradient calculating unit.
Figure 3A:
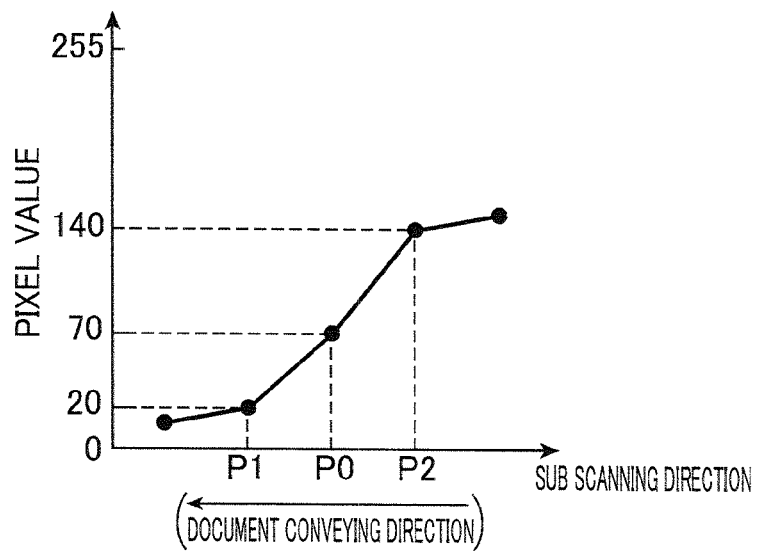
FIGS. 3A, 3B and 3C are graphs showing gradient calculation examples by the gradient calculating unit.
Figure 3B:
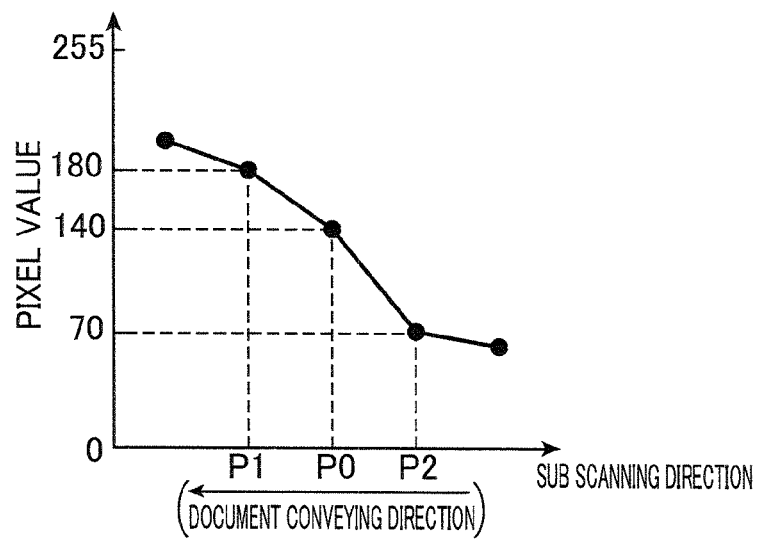
Figure 3C:
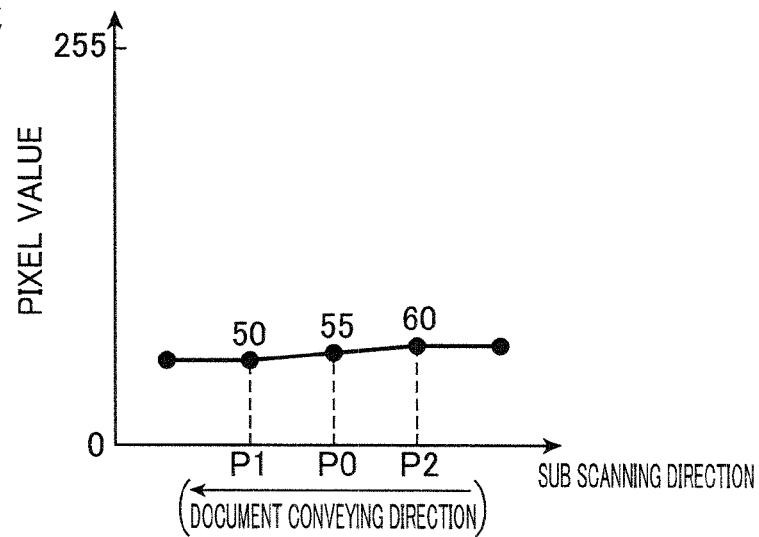
Figure 4A:
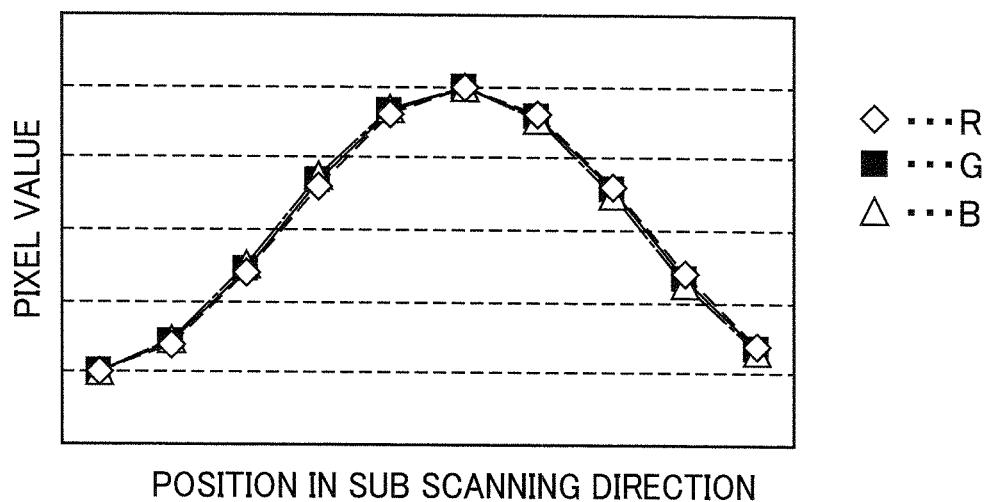
Figure 4B:
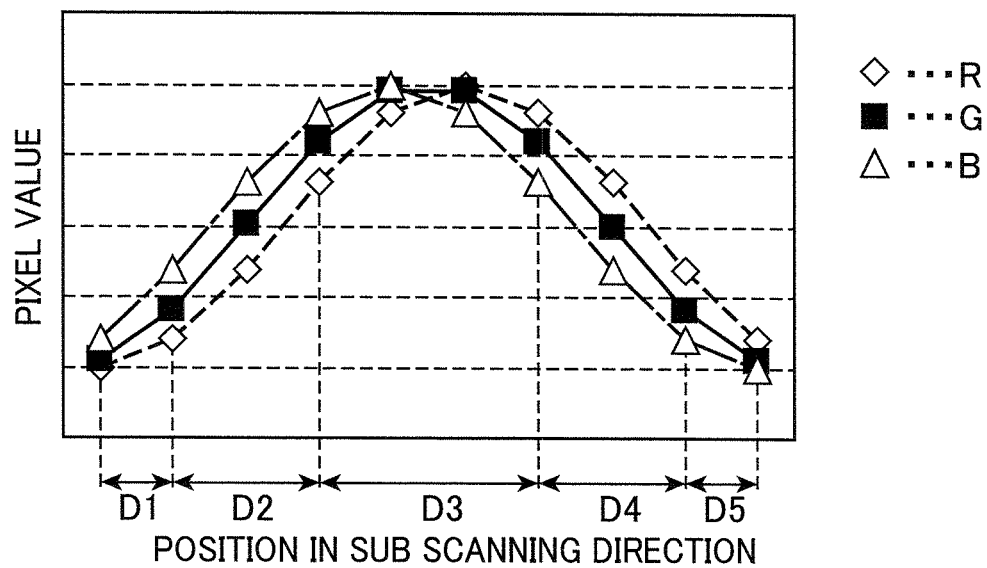

FIG. 2 is a diagram showing a gradient calculation filter 20 used in the gradient calculating unit 18. FIGS. 3A, 3B and 3C are graphs showing gradient calculation examples by the gradient calculating unit 18. FIGS. 4A and 4B are graphs showing examples of pixel values of R, G and B components of a black character, wherein FIG. 4A shows a case where there is no color drift and FIG. 4B shows a case where there is a color drift.

The gradient calculating unit 18 applies the gradient calculation filter 20 shown in FIG. 2 to the pixel values of the R, G and B components of each pixel detected by the image reading unit 14 and calculates a gradient of the pixel value in the document conveying direction for each of the R, G and B components of each pixel. A pixel for which gradients are to be calculated is called a target pixel below.

The gradient calculation filter 20 has a 3×1 matrix configuration as shown in FIG. 2. This gradient calculation filter 20 is configured to multiply the target pixel by "0", multiply a downstream adjacent pixel adjacent to the target pixel at a downstream side in the document conveying direction by "1" and multiply an upstream adjacent pixel adjacent to the target pixel at an upstream side in the document conveying direction by "−1". Since the document is conveyed by the document conveying unit 13 and the image reading unit 14 is fixed in this embodiment, the document conveying direction and a sub scanning direction are right opposite to each other as shown in FIG. 2.

For example, when the pixel value of a target pixel P0=70, that of a downstream adjacent pixel P1=20 and that of an upstream adjacent pixel P2=140 as shown in FIG. 3A, a gradient K of the target pixel P0 is:

$$K=20\times1+70\times0+140\times(-1)=-120.$$

For example, when the pixel value of the target pixel P0=140, that of the downstream adjacent pixel P1=180 and that of the upstream adjacent pixel P2=70 as shown in FIG. 3B, the gradient K of the target pixel P0 is:

$$K=180\times1+140\times0+70\times(-1)=110.$$

For example, when the pixel value of the target pixel P0=55, that of the downstream adjacent pixel P1=50 and that of the upstream adjacent pixel P2=60 as shown in FIG. 3C, the gradient K of the target pixel P0 is:

$$K=50\times1+55\times0+60\times(-1)=-10.$$

As shown in FIGS. 3A, 3B and 3C, it can be understood that the larger the absolute value of the gradient K becomes, the steeper the gradient becomes, and that the smaller the absolute value of the gradient K becomes, the more moderate the gradient becomes.

In this way, the gradient calculating unit 18 calculates the gradient of the pixel value in the document conveying direction for each of R, G and B components while successively setting the respective pixels detected by the image reading unit 14 as a target pixel. In this embodiment, the gradient calculating unit 18 calculates a difference between the pixel value of the pixel P1 adjacent to the target pixel P0 at the downstream side in the document conveying direction and the pixel value of the pixel P2 adjacent to the target pixel P0 at the upstream side as the gradient K of the target pixel P0 using the gradient calculation filter 20. According to this construction, for each pixel, a difference between a pixel value of one pixel adjacent to the each pixel and a pixel value of the other pixel adjacent to the each pixel in the conveying direction is calculated as the gradient of the pixel value in the conveying direction. Thus, the gradient of the pixel value in the conveying direction can be easily calculated.

The gradient comparing unit 19 compares the gradients of the respective color components for each pixel and discriminates whether or not this pixel is present in an edge part of a black character. Here, with reference to FIGS. 4A and 4B, the gradients of the respective color components are described.

In FIGS. 4A and 4B, the pixel at the left end corresponds to an outer side of an edge of a line image constituting a black character. Going in the sub scanning direction from this left end, the pixel value increases since the pixels correspond to an edge part of the line image constituting the black character. The pixel at a position in the sub scanning direction where the pixel value is largest corresponds to a central part of the line image constituting the black character. Going further in the sub scanning direction, the pixel value decreases since the pixels correspond to an edge part at an opposite side of the line image constituting the black character. The pixel at the right end corresponds to an outer side of the edge at the opposite side of the line image constituting the black character.

When the pixel values are free from color drift, the R, G and B components have substantially the same pixel value in each pixel as shown in FIG. 4A. In this case, there is no influence on color document discrimination. In other words, the edge part of the black character can be accurately discriminated.

On the other hand, as described above, color drift may occur in the detection of a document image by the image reading unit 14 due to a rotational speed ripple of the motor provided in the document conveying unit 13, vibration produced when a document is nipped by the conveyor rollers or separated from the conveyor rollers, etc. If this color drift occurs, a result in which the pixel values of the R, G and B components are shifted in the sub scanning direction as shown in FIG. 4B is obtained as a detection result of the document image by the image reading unit 14.

In FIG. 4B, since differences in the pixel values of the respective color components are small in a left end area D1, a central area D3 and a right end area D5, these areas are discriminated to be black. However, since differences in the pixel values of the respective color components are large in areas D2, D4 corresponding to the edge parts of the line image constituting the black character, these areas are discriminated to be color areas despite the fact that they actually represent the edge parts of the black character. This adversely affects the color document discrimination.

Here, if attention is drawn to the gradient of the pixel value of each color component in the document conveying direction (sub scanning direction), it can be understood that the gradients of the pixel values of the R, G and B components in each pixel are substantially equal in the areas D2, D4. This is thought to be because the pixel values of the respective color components are merely shifted in the document conveying direction (sub scanning direction) due to document conveyance.

Accordingly, the gradient comparing unit 19 compares the gradients of the pixel values of the R, G, B components in the document conveying direction for each pixel, judges the pixel with a small difference in the gradients of the respective color components to be a pixel in the edge part of the black character, and extracts such a pixel as a specific pixel.

Specifically, if Kr, Kg and Kb respectively denote the gradients of the R, G and B components of the target pixel, the gradient comparing unit 19 extracts a maximum value Kmax and a minimum value Kmin out of the gradients Kr, Kg and Kb. Then, the gradient comparing unit 19 compares a difference between the maximum and the minimum values with a predetermined threshold value Kth and extracts the target pixel as a specific pixel if Kth>Kmax−Kmin. Then, the gradient comparing unit 19 outputs, for example, a signal "01" for the specific pixel to the document discriminating unit 15 and outputs, for example, a signal "00" for the other pixel, that is, pixel for which Kth≤Kmax−Kmin, to the document discriminating unit 15. According to this construction, the gradient comparing unit can easily calculate a gradient difference since extracting a maximum value and a minimum value out of gradients calculated for a plurality of respective color components by the gradient calculating unit 18 and calculating a difference between the maximum and the minimum values as a gradient difference.

The document discriminating unit 15 discriminates whether each pixel is color or black-and-white by referring to the signals sent from the gradient comparing unit 19 in addition to the pixel values (image data) of the R, G and B components sent from the image reading unit 14, and discriminates whether the document is a color document or a black-and-white document based on the discrimination result. Note that a known technology conventionally proposed, for example, in Japanese Unexamined Patent Publications Nos. 2001-128024 and 2003-319193 may be used for a specific color document discrimination process in the document discriminating unit 15.

Specifically, pixel values of R (red), G (green) and B (blue) components of a target pixel P are, for example, denoted by Pr, Pg and Pb. At this time, the document discriminating unit 15 uses a pixel discrimination criterion of judging that the target pixel P is a color pixel when at least one condition is satisfied out of three conditions; a condition that a difference between the pixel values Pb and Pg is larger than a predetermined threshold value, a condition that a difference between the pixel values Pg and Pr is larger than the predetermined threshold value and a condition that a difference between the pixel values Pr and Pb is larger than the predetermined threshold value. Further, the document discriminating unit 15 uses a document discrimination criterion of incrementing a count value of color pixels by 1 when the target pixel P is judged to be a color pixel, repeating this for each pixel and discriminating that the read document is a color document when the number of counted color pixels reaches a threshold value set beforehand.

In this embodiment, the document discriminating unit 15 discriminates whether each pixel is color or black-and-white using the above pixel discrimination criterion for pixels other than specific pixels, that is, pixels for which the signal "00" is sent from the gradient comparing unit 19. For example, in the case as shown in FIG. 4A, the respective pixels are discriminated to be black. The document discriminating unit 15 discriminates specific pixels, for which the signal "01" is sent from the gradient comparing unit 19, to be black-and-white pixels even if these pixels are discriminated to be present in a color edge part, as in the areas D2, D4 of FIG. 4B for example, if the above pixel discrimination criterion is used.

Figure 5:
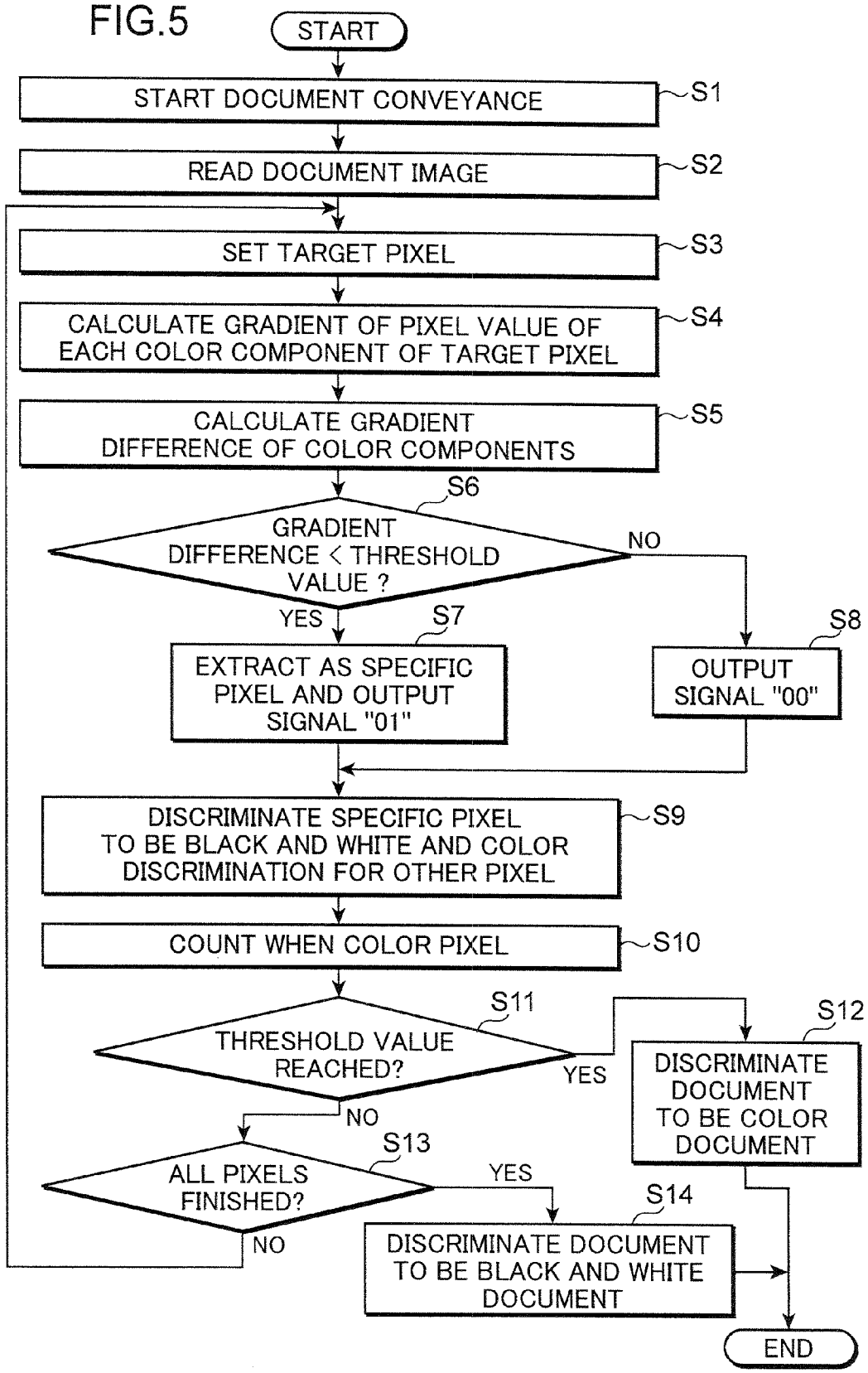
FIG. 5 is a flow chart showing an operation in an automatic color document discrimination mode.

FIG. 5 is a flow chart showing a document discrimination operation in the automatic color document discrimination mode. First, when conveyance of a document is started by the document conveying unit 13 (Step S1), a document image is read by the image reading unit 14 and pixel values of the R, G and B components are sent pixel by pixel to the document discriminating unit 15, the image processing unit 16 and the gradient calculating unit 18 (Step S2).

Subsequently, a target pixel as a pixel for which gradients are to be calculated is set (Step S3). Normally, pixels are successively set as this target pixel from the leading pixel of the document. Subsequently, a gradient of the pixel value of each of the R, G and B components of the target pixel in the document conveying direction is calculated (Step S4). Then, the gradient comparing unit 19 extracts a maximum value and a minimum value out of the gradients of the R, G, and B components, calculates a difference between the maximum and the minimum values as a gradient difference (Step S5), and compares the gradient difference with the predetermined threshold value (Step S6).

If the gradient difference is below the threshold value (YES in Step S6), the target pixel is extracted as a specific pixel and a signal "01" is output from the gradient comparing unit 19 to the document discriminating unit 15 (Step S7) and the flow proceeds to Step S9. On the other hand, if the gradient difference is equal to or above the threshold value (NO in Step S6), a signal "00" is output from the gradient comparing unit 19 to the document discriminating unit 15 (Step S8) and the flow proceeds to Step S9.

In Step S9, the specific pixel, for which the signal "01" was output, is discriminated to be black-and-white, whereas color or black-and-white discrimination is made for the pixel other than the specific pixel, for which the signal "00" was output, using the above pixel discrimination criterion. Subsequently, when the pixel is discriminated to be color, the count value of color pixels is incremented by 1 (Step S10).

Subsequently, whether or not the count value of the color pixels has reached a threshold value set beforehand is discriminated (Step S11). If the threshold value has been reached (YES in Step S11), this document is discriminated to be a color document (Step S12) and this process is finished.

On the other hand, unless the count value of the color pixels has reached the threshold value (NO in Step S11), whether or not discrimination of all the pixels of the document has been finished is determined (Step S13). Unless discrimination of all the pixels of the document has been finished (NO in Step S13), the flow returns to Step S3 to set a next target pixel and the above routine is repeated. On the other hand, if discrimination of all the pixels of the document has been finished (YES in Step S13), the document is discriminated to be a black-and-white document (Step S14) and this process is finished.

As described above, according to this embodiment, a pixel, of which a difference of the gradient K among the pixel values of the R, G and B components in the conveying direction is below the threshold value Kth, is extracted as a specific pixel by the gradient comparing unit 19 and the specific pixel is discriminated to be black-and-white by the document discriminating unit 15. Thus, even if color drift occurs in pixels in edge parts of a black character due to conveyance of a document by the document conveying unit 13, whether the document is a color document or a black-and-white document can be accurately discriminated.

Figure 6:
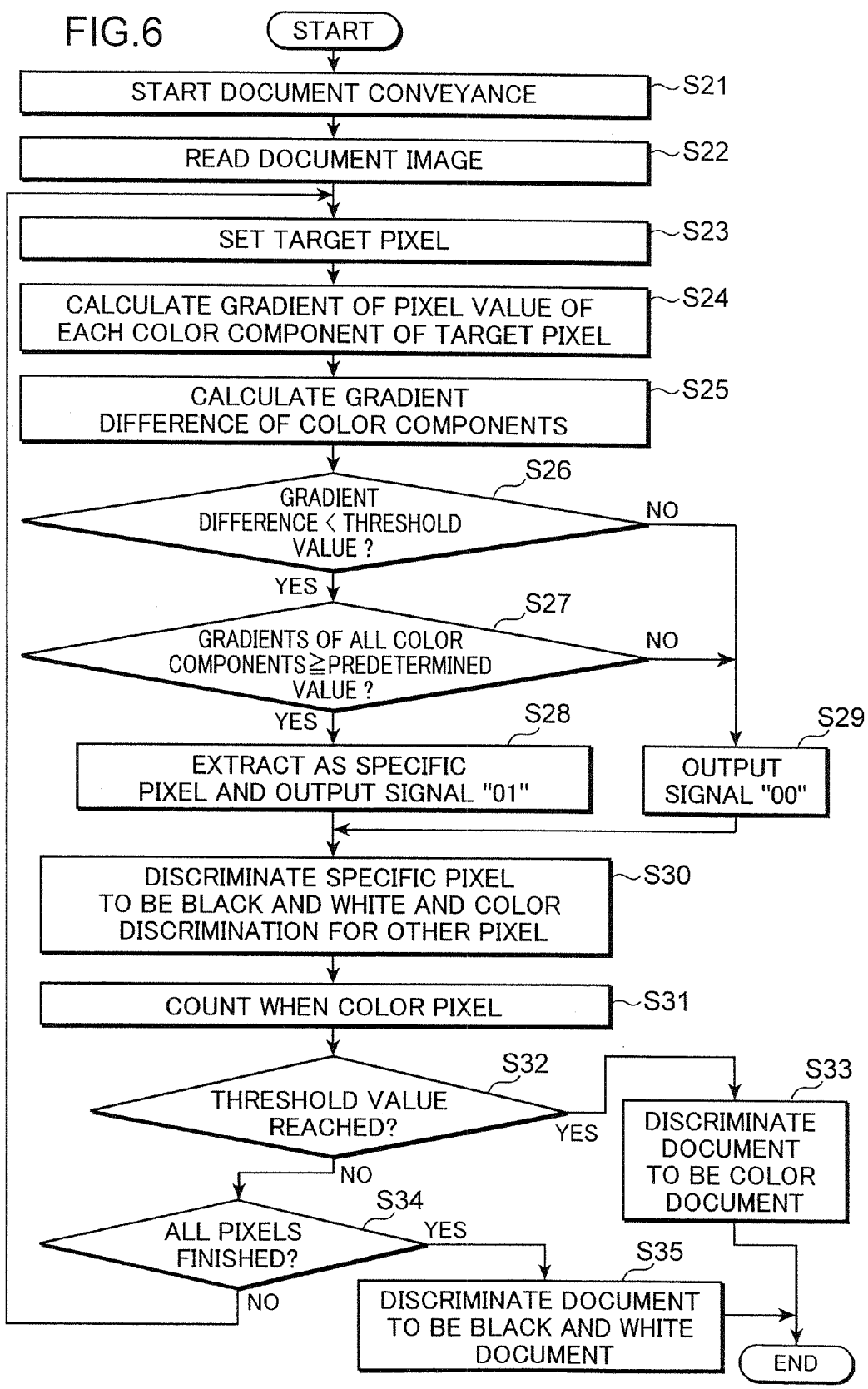
FIG. 6 is a flow chart showing another operation in the automatic color document discrimination mode.

Although the specific pixel is extracted only based on the gradient differences of the R, G and B components in the above embodiment, the present invention is not limited to this. For example, edge parts of a black character where color drift is problematic normally have a somewhat steep gradient as shown in FIGS. 4A and 4B. Accordingly, determination as to whether or not the gradients of the R, G and B components are respectively equal to or larger than a predetermined value may be made in addition to determination as to the gradient differences of the R, G and B components. FIG. 6 is a flow chart showing another operation in the automatic color document discrimination mode.

In the modification shown in FIG. 6, if Kr, Kg and Kb respectively denote gradients of R, G and B components of a target pixel, the gradient comparing unit 19 extracts a maximum value Kmax and a minimum value Kmin out of the gradients Kr, Kg and Kb as in the above embodiment. Then, the gradient comparing unit 19 compares a difference between the maximum and the minimum values with a predetermined threshold value Kth and further compares the gradients Kr, Kg and Kb with a predetermined value Kth2 if Kth>Kmax−Kmin. If Kr≥Kth2, Kg≥Kth2 and Kb≥Kth2, the gradient comparing unit 19 extracts this target pixel as a specific pixel and outputs, for example, a signal "01" to the document discriminating unit 15.

On the other hand, the gradient comparing unit 19 outputs, for example, a signal "00" for the pixel other than the specific pixel, that is, for which Kth≤Kmax−Kmin, or Kr<Kth2 or Kg<Kth2 or Kb<Kth2 even if Kth>Kmax−Kmin.

In FIG. 6, Steps S21 to S25 are respectively similar to Steps S1 to S5 of FIG. 5. In Step S26, the gradient difference is compared with a predetermined threshold value. If the gradient difference is below the threshold value (YES in Step S26), whether or not the gradients of the R, G and B components are equal to or above the predetermined value is discriminated (Step S27). If the gradients of all the R, G and B components are equal to or above the predetermined value (YES in Step S27), the flow proceeds to Step S28.

On the other hand, if the gradient difference is equal to or above the threshold value (NO in Step S26), the flow proceeds to Step S29. Further, if the gradient of any one of the R, G and B components is below the predetermined value (NO in Step S27), the flow proceeds to Step S29. Steps S28 to S35 are respectively similar to Steps S7 to S14 of FIG. 5.

As described above, edge parts of a black character where color drift is problematic normally have a somewhat steep gradient as shown in FIGS. 4A and 4B. Thus, according to this modification, specific pixels can be reliably pixels included in the edge parts of the black character. Therefore, accuracy in extracting specific pixels can be improved.

Although the document discriminating unit 15 discriminates the specific pixel to be black-and-white and discriminates whether the pixel other than the specific pixel is color or black-and-white using the specified image discrimination criterion in the above embodiment, the present invention is not limited to this. For example, the document discriminating unit 15 may exclude the specific pixels from the pixels for which color discrimination is to be made. Further, the document discriminating unit 15 may be provided, in addition to the normal pixel discrimination criterion used to discriminate whether the pixel other than the specific pixel is color or black-and-white, with a specific pixel discrimination criterion of which a probability of discriminating a pixel to be color is set lower than that of the normal pixel discrimination criterion, and the document discriminating unit 15 may discriminate whether the specific pixel is color or black-and-white using the specific pixel discrimination criterion. In the above embodiment, it can be said, in other words, that the document discriminating unit 15 discriminates whether the specific pixel is color or black-and-white using the specific pixel discrimination criterion of which a probability of discriminating a pixel to be color is set zero.

Although the gradient comparing unit 19 outputs the signal "01" to the document discriminating unit 15 for the specific pixel and outputs the signal "00" to the document discriminating unit 15 for the pixel other than the specific pixel in the above embodiment, these signals are only examples and any signals, with which the document discriminating unit 15 can distinguish the specific pixels and the pixels other than the specific pixels, may be used.

The respective blocks of the document discriminating unit 15, the gradient calculating unit 18 and the gradient comparing unit 19 may be realized by a hardware logic or by software using a computer. In the case of realization by software, the above blocks include a CPU (central processing unit), a ROM (read only memory), a RAM (random access memory), etc. and are realized by developing a program read from the ROM on the RAM by the CPU. In other words, effects similar to those of this embodiment can also be obtained by a program which causes an information processing apparatus such as a computer including conveyor rollers, a motor that drives the conveyor rollers, a detector that detects pixel values of a plurality of color components, and the like to function as the document conveying unit 13, the image reading unit 14, the document discriminating unit 15, the gradient calculating unit 18 and the gradient comparing unit 19. Note that the CPU in this case may be provided separately from the CPU 11 or the CPU 11 may additionally include functions of the respective blocks.

The ROM that stores the above program functions as a non-transitory computer readable recording medium. The above information processing apparatus such as a computer may include a reader that reads a computer readable recording medium, for example, such as a magnetic disk, an optical disk or a semiconductor memory which stores the above program and may read the program from the recording medium to execute it.

Although the image processing apparatus 1 reads a document and outputs a read document image to an external apparatus such as the printer 31 (shown in broken line in FIG. 1) in the above embodiment, the present invention is not limited to this. For example, in an image forming apparatus 2 such as a copier including the built-in image processing apparatus 1 and an image forming unit 32 as shown in broken line in FIG. 1, the image processing apparatus 1 may output a read document image to the image forming unit 32 from the image output unit 17 and the image forming unit 32 may form an image on a sheet. According to this image forming apparatus 2, a high-quality image can be formed on a sheet since whether a document is a color document or a black-and-white document can be discriminated with high accuracy. Further, for example, in a facsimile machine 3 including the built-in image processing apparatus 1 and a transmitting unit 33 as shown in broken line in FIG. 1, the image processing apparatus 1 may output a read document image to the transmitting unit 33 from the image output unit 17 and image data may be transmitted by the transmitting unit 33 outside. According to this facsimile machine 3, a high-quality image can be transmitted since whether a document is a color document or a black-and-white document can be discriminated with high accuracy.

In the color document discrimination technology for extending an achromatic area described in the above "Description of the Background Art", in an image in which a black character is present on a chromatic base for example, the base around the black character is included in the extended achromatic area and is excluded, and there is a possibility that discrimination accuracy is affected. Further, a thin black line or the like may be read, for example, as three thin lines of R, G and B due to color drift, whereby an achromatic area itself cannot be detected. Therefore, there is a problem that a positive effect cannot be obtained. In the color document discrimination technology for making a color document discrimination function inoperative for a predetermined area described in the above "Description of the Background Art", there is a possibility that the color document discrimination function is made inoperative over a very wide range if an area assumed to be subject to color drift is enlarged, whereby it is expected to weaken a color document discrimination effect and affect discrimination accuracy. In the color document discrimination technology for switching the discrimination criterion described in the above "Description of the Background Art", color determination becomes difficult if the parameter of the color document discrimination is switched to the parameter with an increased level of discrimination criterion to make color document discrimination difficult. Thus, similar to the color document discrimination technology for making the color document discrimination function inoperative for the predetermined area, color document discrimination accuracy might be reduced over a very wide range.

In contrast, according to the above image processing apparatus, a pixel, of which a difference, among a plurality of color components, of the gradient of pixel values in the conveying direction is below the predetermined threshold value, is extracted as a specific pixel.

In case of color drift in an edge part of a black character due to conveyance of a document by the document conveying unit, the color drift occurs by the shifts of the pixel values in the document conveying direction. Thus, even if there are differences in the pixel values of the plurality of color components, the difference among the plurality of color components of the gradient of the pixel values in the conveying direction is small when the difference is caused by the color drift due to conveyance of the document by the document conveying unit. Therefore, the specific pixel has a high possibility of being a pixel in the edge part of the black character. On the other hand, in case of a pixel in an edge part of a color character, the difference among the plurality of color components of the gradient of the pixel values in the conveying direction is equal to or above the threshold value. Thus, there is no likelihood of extracting this pixel as a specific pixel. Accordingly, even if color drift occurs in pixels in an edge part of a black character due to conveyance of a document by the document conveying unit, whether each pixel is color or black-and-white can be accurately discriminated by using different pixel discrimination criteria for specific pixels and other pixels. As a result, whether a document is a color document or a black-and-white document can be discriminated with high accuracy.

This application is based on Japanese Patent application No. 2010-147363 filed in Japan Patent Office on Jun. 29, 2010, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An image processing apparatus, comprising:
a document conveying unit that conveys a document in a predetermined conveying direction;
an image reading unit that repeatedly scans the document conveyed by the document conveying unit in a main scanning direction substantially orthogonal to the conveying direction and detects pixel values of a plurality of color components of each pixel;
a gradient calculating unit that calculates a gradient in the conveying direction for each pixel and for each of the plurality of color components based on the pixel values of the plurality of color components of each pixel detected by the image reading unit;
a gradient comparing unit that compares, for each pixel, a difference of the gradient among the plurality of color components and extracts the pixel, of which the difference of the gradient is below a predetermined threshold value, as a specific pixel; and
a document discriminating unit that discriminates whether each pixel is color or black-and-white based on the pixel values of the plurality of color components of each pixel detected by the image reading unit using pixel discrimination criteria different for the specific pixels extracted by the gradient comparing unit and other pixels, wherein
a pixel for which a gradient is to be calculated is a target pixel, and
the gradient calculating unit calculates, without using the pixel value of the target pixel, a difference between the pixel value of a first adjacent pixel that is adjacent to the target pixel at an upstream side in the conveying direction and the pixel value of a second adjacent pixel that is adjacent to the target pixel at a downstream side in the conveying direction as the gradient in the conveying direction of the target pixel.

2. The image processing apparatus according to claim 1, wherein the gradient comparing unit extracts a pixel of which the difference of the gradient is below the threshold value and each of the gradients of the plurality color components is equal to or above a predetermined value as the specific pixel.

3. The image processing apparatus according to claim 1, wherein the gradient comparing unit extracts a maximum value and a minimum value out of the gradients calculated for the respective plurality of color components by the gradient calculating unit and sets a difference between the maximum value and the minimum value as the difference of the gradient.

4. The image processing apparatus according to claim 1, wherein the document discriminating unit discriminates the specific pixel to be black-and-white.

5. An image forming apparatus, comprising:
the image processing apparatus according to claim 1; and
an image forming unit that forms an image on a sheet,
wherein the image processing apparatus further includes an image processing unit that performs an image processing on the pixel values detected by the image reading unit according to a discrimination result by the document discriminating unit, and an image output unit that outputs an image processing result by the image processing unit to the image forming unit,
and wherein the image forming unit forms the image based on an output from the image output unit.

6. A facsimile machine, comprising:
the image processing apparatus according to claim 1; and
a transmitting unit that transmits an image outside,
wherein the image forming apparatus further includes an image processing unit that performs an image processing on the pixel values detected by the image reading unit according to a discrimination result by the document discriminating unit, and an image output unit that outputs an image processing result by the image processing unit to the image forming unit,
and wherein the transmitting unit transmits the image based on an output from the image output unit.

7. An image processing method, comprising:
an image reading step of repeatedly scanning a document in a main scanning direction substantially orthogonal to a predetermined conveying direction while the document is conveyed in the conveying direction by a document conveying unit, and detecting pixel values of a plurality of color components of each pixel;
a gradient calculating step of calculating a gradient in the conveying direction for each pixel and for each of the plurality of color components based on the pixel values of the plurality of color components of each pixel detected in the image reading step;
a gradient comparing step of comparing a difference of the gradient among the plurality of color components for each pixel and extracting the pixel, of which the difference of the gradient is below a predetermined threshold value, as a specific pixel; and a document discriminating step of discriminating whether each pixel is color or black-and-white based on the pixel values of the plurality of color components of each pixel detected in the image reading step using pixel discrimination criteria different for the specific pixels extracted in the gradient comparing step and other pixels, wherein a pixel for which a gradient is to be calculated is a target pixel, and in the gradient calculating step, without using the pixel value of the target pixel, a difference between the pixel value of a first adjacent pixel that is adjacent to the target pixel at an upstream side in the conveying direction and the pixel value of a second adjacent pixel that is adjacent to the target pixel at a downstream side in the conveying direction, is calculated as the gradient in the conveying direction of the target pixel.

8. A non-transitory computer readable recording medium that stores an image processing program which causes a computer to function as an image processing apparatus, the program causing the computer to function as:

a document conveying unit that conveys a document in a predetermined conveying direction;

an image reading unit that repeatedly scans the document conveyed by the document conveying unit in a main scanning direction substantially orthogonal to the conveying direction and detects pixel values of a plurality of color components of each pixel;

a gradient calculating unit that calculates a gradient in the conveying direction for each pixel and for each of the plurality of color components based on the pixel values of the plurality of color components of each pixel detected by the image reading unit;

a gradient comparing unit that compares, for each pixel, a difference of the gradient among the plurality of color components and extracts the pixel, of which the difference of the gradient is below a predetermined threshold value, as a specific pixel; and a document discriminating unit that discriminates whether each pixel is color or black-and-white based on the pixel values of the plurality of color components of each pixel detected by the image reading unit using pixel discrimination criteria different for the specific pixels extracted by the gradient comparing unit and other pixels, wherein a pixel for which a gradient is to be calculated is a target pixel, and the gradient calculating unit calculates, without using the pixel value of the target pixel, a difference between the pixel value of a first adjacent pixel that is adjacent to the target pixel at an upstream side in the conveying direction and the pixel value of a second adjacent pixel that is adjacent to the target pixel at a downstream side in the conveying direction as the gradient in the conveying direction of the target pixel.

* * * * *